US009553885B2

(12) United States Patent
Touboul et al.

(10) Patent No.: US 9,553,885 B2
(45) Date of Patent: Jan. 24, 2017

(54) SYSTEM AND METHOD FOR CREATION, DEPLOYMENT AND MANAGEMENT OF AUGMENTED ATTACKER MAP

(71) Applicant: Illusive Networks Ltd., Tel Aviv (IL)

(72) Inventors: Shlomo Touboul, Kfar Chaim (IL); Hanan Levin, Tel Aviv (IL); Stephane Roubach, Herzliya (IL); Assaf Mischari, Petach Tikva (IL); Itai Ben David, Tel Aviv (IL); Itay Avraham, Tel Aviv (IL); Adi Ozer, Shoham (IL); Chen Kazaz, Tel Aviv (IL); Ofer Israeli, Tel Aviv (IL); Olga Vingurt, Shderot (IL); Liad Gareh, Herzliya (IL); Israel Grimberg, Ra'anana (IL); Cobby Cohen, Tel Aviv (IL); Sharon Sultan, Tel Aviv (IL); Matan Kubovsky, Tel Aviv (IL)

(73) Assignee: ILLUSIVE NETWORKS LTD., Tel Aviv (IL)

( * ) Notice: Subject to any disclaimer, the term of this patent is extended or adjusted under 35 U.S.C. 154(b) by 0 days.

(21) Appl. No.: 15/004,904

(22) Filed: Jan. 23, 2016

(65) Prior Publication Data
US 2016/0359876 A1    Dec. 8, 2016

Related U.S. Application Data

(60) Provisional application No. 62/172,251, filed on Jun. 8, 2015, provisional application No. 62/172,253, filed (Continued)

(51) Int. Cl.
*G06F 12/14* (2006.01)
*G06F 12/16* (2006.01)
(Continued)

(52) U.S. Cl.
CPC .......... *H04L 63/1416* (2013.01); *G06F 21/56* (2013.01); *G06F 21/577* (2013.01); *H04L 63/1425* (2013.01)

(58) Field of Classification Search
None
See application file for complete search history.

(56) References Cited

U.S. PATENT DOCUMENTS 6,363,489 B1    3/2002  Comay et al.
7,089,589 B2    8/2006  Chefalas et al.
(Continued)

FOREIGN PATENT DOCUMENTS

WO    2006131124 A1    12/2006

OTHER PUBLICATIONS

Wikipedia, Active Directory, https://en.wikipedia.org/wiki/Active_Directory, Jun. 24, 2015.

(Continued)

*Primary Examiner* — Fatoumata Traore
(74) *Attorney, Agent, or Firm* — Soquel Group I.P Ltd.

(57) ABSTRACT

A network surveillance system including a deception management server within a network, including a deployment module managing and planting decoy attack vectors in network resources, wherein an attack vector is an object in memory or storage of a first resource that may be used to access a second resource, and decoy servers accessible from resources in the network via decoy attack vectors, each decoy server including a forensic alert module causing a real-time forensic application to be transmitted to a destination resource in the network when the decoy server is being accessed by a specific resource in the network via a decoy attack vector, wherein the forensic application, when launched in the destination resource, identifies a process running within the specific resource that is accessing that (Continued)

decoy server, logs the activities performed by the thus-identified process in a forensic report, and transmits the forensic report to the deception management server.

14 Claims, 7 Drawing Sheets

Related U.S. Application Data on Jun. 8, 2015, provisional application No. 62/172,255, filed on Jun. 8, 2015, provisional application No. 62/172,259, filed on Jun. 8, 2015, provisional application No. 62/172,261, filed on Jun. 8, 2015.

(51) Int. Cl.
*H04L 29/06* (2006.01)
*G06F 21/57* (2013.01)
*G06F 21/56* (2013.01)

(56) References Cited

U.S. PATENT DOCUMENTS

| | | | |
|---|---|---|---|
| 7,093,291 B2 | 8/2006 | Bailey | |
| 7,574,741 B2 | 8/2009 | Aviani et al. | |
| 7,636,944 B2 | 12/2009 | Raikar | |
| 7,665,134 B1 | 2/2010 | Hernacki et al. | |
| 7,694,339 B2 | 4/2010 | Blake et al. | |
| 7,725,937 B1 | 5/2010 | Levy | |
| 7,752,664 B1 | 7/2010 | Satish et al. | |
| 8,181,249 B2 | 5/2012 | Chow et al. | |
| 8,181,250 B2 | 5/2012 | Rafalovich et al. | |
| 8,375,447 B2 | 2/2013 | Amoroso et al. | |
| 8,528,091 B2 | 9/2013 | Bowen et al. | |
| 8,549,642 B2 | 10/2013 | Lee | |
| 8,549,643 B1* | 10/2013 | Shou | G06F 21/556 455/410 |
| 8,719,938 B2 | 5/2014 | Chasko et al. | |
| 8,739,281 B2 | 5/2014 | Wang et al. | |
| 8,769,684 B2 | 7/2014 | Stolfo et al. | |
| 8,819,825 B2 | 8/2014 | Keromytis et al. | |
| 8,856,928 B1 | 10/2014 | Rivner et al. | |
| 9,009,829 B2 | 4/2015 | Stolfo et al. | |
| 2002/0066034 A1 | 5/2002 | Schlossberg et al. | |
| 2003/0084349 A1 | 5/2003 | Friedrichs et al. | |
| 2006/0224677 A1 | 10/2006 | Ishikawa et al. | |
| 2007/0028301 A1 | 2/2007 | Shull et al. | |
| 2007/0192853 A1 | 8/2007 | Shraim et al. | |
| 2008/0016570 A1 | 1/2008 | Capalik | |
| 2008/0086773 A1 | 4/2008 | Tuvell et al. | |
| 2009/0019547 A1 | 1/2009 | Palliyil et al. | |
| 2009/0241191 A1 | 9/2009 | Keromytis et al. | |
| 2009/0241196 A1 | 9/2009 | Troyansky et al. | |
| 2010/0077483 A1* | 3/2010 | Stolfo | G06F 21/554 726/24 |
| 2011/0214182 A1 | 9/2011 | Adams et al. | |
| 2012/0167208 A1 | 6/2012 | Buford et al. | |
| 2013/0212644 A1 | 8/2013 | Hughes et al. | |
| 2014/0115706 A1 | 4/2014 | Silva et al. | |
| 2014/0208401 A1 | 7/2014 | Balakrishnan et al. | |
| 2014/0359708 A1* | 12/2014 | Schwartz | G06F 15/173 726/4 |
| 2015/0096048 A1 | 4/2015 | Zhang et al. | |
| 2015/0128246 A1 | 5/2015 | Feghali et al. | |

OTHER PUBLICATIONS

Wikpedia, Apple Filing Protocol, https://en.wikipedia.org/wiki/Apple_Filing_Protocol, Aug. 14, 2015.
Wikipedia, DMZ (computing), https://en.wikipedia.org/wiki/DMZ_(computing), Jun. 17, 2015.
Wikipedia, Domain Name System, https://en.wikipedia.org/wiki/Domain_Name_System, Jul. 14, 2015.
Wikipedia, Firewall (computing), https://en.wikipedia.org/wiki/Firewall_(computing), Jul. 14, 2015.
Wikipedia, Honeypot (computing), https://en.wikipedia.org/wiki/Honeypot_(computing), Jun. 21, 2015.
Wikipedia, Kerberos (protocol), https://en.wikipedia.org/wiki/Kerberos_(protocol), Jun. 30, 2015.
Wikipedia, Lightweight Directory Access Protocol, https://en.wikipedia.org/wiki/Lightweight_Directory_Access_Protocol, Aug. 15, 2015.
Wikipedia, LM hash, https://en.wikipedia.org/wiki/LM_hash, Jun. 8, 2015.
Wikipedia, RADIUS, https://en.wikipedia.org/wiki/RADIUS, Aug. 16, 2015.
Wikipedia, Rainbow table, https://en.wikipedia.org/wiki/Rainbow_table, Jul. 14, 2015.
Wikipedia, Secure Shell, https://en.wikipedia.org/wiki/Honeypot_(computing), Jul. 12, 2015.
Wikipedia, Security Information and Event Management, https://en.wikipedia.org/wiki/Security_information_and_event_management, Jun. 23, 2015.
Wikipedia, Tarpit (networking), https://en.wikipedia.org/wiki/Tarpit_(networking), Jul. 3, 2014.
PCT Application No. PCT/IL16/50103, International Search Report and Written Opinion, May 26, 2016, 9 pages.

\* cited by examiner

SYSTEM AND METHOD FOR CREATION, DEPLOYMENT AND MANAGEMENT OF AUGMENTED ATTACKER MAP

CROSS REFERENCES TO RELATED APPLICATIONS

This application is a non-provisional of U.S. Provisional Application No. 62/172,251, entitled SYSTEM AND METHOD FOR CREATION, DEPLOYMENT AND MANAGEMENT OF AUGMENTED ATTACKER MAP, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen and Sharon Sultan, the contents of which are hereby incorporated herein in their entirety.

This application is a non-provisional of U.S. Provisional Application No. 62/172,253, entitled SYSTEM AND METHOD FOR MULTI-LEVEL DECEPTION MANAGEMENT AND DECEPTION SYSTEM FOR MALICIOUS ACTIONS IN A COMPUTER NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen and Sharon Sultan, the contents of which are hereby incorporated herein in their entirety.

This application is a non-provisional of U.S. Provisional Application No. 62/172,255, entitled METHODS AND SYSTEMS TO DETECT, PREDICT AND/OR PREVENT AN ATTACKER'S NEXT ACTION IN A COMPROMISED NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen and Sharon Sultan, the contents of which are hereby incorporated herein in their entirety.

This application is a non-provisional of U.S. Provisional Application No. 62/172,259, entitled MANAGING DYNAMIC DECEPTIVE ENVIRONMENTS, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen and Sharon Sultan, the contents of which are hereby incorporated herein in their entirety.

This application is a non-provisional of U.S. Provisional Application No. 62/172,261, entitled SYSTEMS AND METHODS FOR AUTOMATICALLY GENERATING NETWORK ENTITY GROUPS BASED ON ATTACK PARAMETERS AND/OR ASSIGNMENT OF AUTOMATICALLY GENERATED SECURITY POLICIES, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen and Sharon Sultan, the contents of which are hereby incorporated herein in their entirety

FIELD OF THE INVENTION

The present invention relates to computer security, and in particular to computer network surveillance.

BACKGROUND OF THE INVENTION

Reference is made to FIG. 1, which is a simplified diagram of a prior art enterprise network 100 connected to an external internet 10. Network 100 is shown generally with resources including computers 110, databases 120, switches and routers 130, and mobile devices 140 such as smart phones and tablets, for ease of presentation, although it will be appreciated by those skilled in the art that enterprise networks today are generally much more complex and include other devices such as printers, other types of network elements such as relays, and any Internet of Things objects. The various connections shown in FIG. 1 may be direct or indirect, wired or wireless communications, or a combination of wired and wireless connections. Computers 110 and databases 120 may be physical elements or logical elements, or a mix of physical and logical elements. Computers 110 and databases 120 may be virtual machines. Computer 110 and databases 120 may be local, remote or cloud-based elements, or a mix of local, remote and cloud-based elements. Computers 110 may be client workstation computers, or server computers including inter alia file transfer protocol (FTP) servers, email servers, structured query language (SQL) servers, secure shell (SSH) servers and other application servers, or a mix of client and server computers. A corporate information technology (IT) department manages and controls network 100 in order to serve the corporate requirements and meet the corporate needs.

Access to computers 110 and servers 120 in network 100 may optionally be governed by an access governor 150, such as a directory service, that authorizes users to access computers 110 and databases 120 based on "credentials". Access governor 150 may be a name directory, such as ACTIVE DIRECTORY® developed by Microsoft Corporation of Redmond, Wash., for WINDOWS® environments. Background information about ACTIVE DIRECTORY® is available at Wikipedia. Other access governors for WINDOWS and non-WINDOWS environments, include inter alia Lightweight Directory Access Protocol (LDAP), Remote Authentication Dial-In User Service (RADIUS), and Apple Filing Protocol (AFP), formerly APPLETALK®, developed by Apple Inc. of Cupertino, Calif. Background information about LDAP, RADIUS and AFP is available at Wikipedia.

Access governor 150 may be one or more local machine access controllers. Access governor 150 may be one or more authorization servers, such as a database server or an application server.

In lieu of access governor 150, the endpoints and/or servers of network 100 determine their local access rights.

Credentials for accessing computers 110 and databases 120 include inter alia server account credentials such as <address> <username> <password> for an FTP server, an SQL server, or an SSH server. Credentials for accessing computers 110 and databases 120 also include user login credentials <username> <password>, or <username> <ticket>, where "ticket" is an authentication ticket, such as a ticket for the Kerberos authentication protocol or NTLM hash used by Microsoft Corp., or login credentials via certificates or via another implementation used today or in the future. Background information about the Kerberos protocol and the LM hash is available at Wikipedia.

Access governor 150 may maintain a directory of computers 110, databases 120 and their users. Access governor 150 authorizes users and computers, assigns and enforces security policies, and installs and updates software. When a user logs into a computer 110, access governor 150 checks the submitted password, and determines if the user is an administrator (admin), a normal user (user) or other user type.

Computers 110 may run a local or remote security service, which is an operating system process that verifies users logging in to computers and other single sign-on systems and other credential storage systems.

Network 100 may include a security information and event management (SIEM) server 160, which provides real-time analysis of security alerts generated by network hardware and applications. Background information about SIEM is available at Wikipedia.

Network 100 may include a domain name system (DNS) server 170, or such other name service system, for translating domain names to IP addresses. Background information about DNS is available at Wikipedia.

Network 100 may include a firewall 180 located within a demilitarized zone (DMZ), which is a gateway between enterprise network 100 and external internet 10. Firewall 180 controls incoming and outgoing traffic for network 100. Background information about firewalls and DMZ is available at Wikipedia.

One of the most prominent threats that organizations face is a targeted attack; i.e., an individual or group of individuals that attacks the organization for a specific purpose, such as stealing data, using data and systems, modifying data and systems, and sabotaging data and systems. Targeted attacks are carried out in multiple stages, typically including inter alia reconnaissance, penetration, lateral movement and payload. Lateral movement involves orientation, movement and propagation, and includes establishing a foothold within the organization and expanding that foothold to additional systems within the organization.

In order to carry out the lateral movement stage, an attacker, whether a human being who is operating tools within the organization's network, or a tool with "learning" capabilities, learns information about the environment it is operating in, such as network topology and organization structure, learns "where can I go from my current step" and "how can I go from my current step (privileged required)", and learns implemented security solutions, and then operates in accordance with that data. One method to defend against such attacks, termed "honeypots", is to plant and monitor misleading information/decoys/bait, with the objective of the attacker learning of their existence and then consuming those bait resources, and to notify an administrator of the malicious activity. Background information about honeypots is available at Wikipedia.

Conventional honeypot systems operate by monitoring access to a supervised element in a computer network. Access monitoring generates many false alerts, caused by non-malicious access from automatic monitoring systems and by user mistakes. Conventional systems try to mitigate this problem by adding a level of interactivity to the honeypot, and by performing behavioral analysis of suspected malware if it has infected the honeypot itself.

An advanced attacker may use different attack techniques to enter a corporate network and to move laterally within the network in order to obtain its resource goals. The advanced attacker may begin with a workstation, server or any other network entity to start his lateral movement. He uses different methods to enter the first network node, including inter alia social engineering, existing exploit and/or vulnerability that he knows to exercise, and a Trojan horse or any other malware allowing him to control the first node.

Reference is made to FIG. 2, which is a simplified diagram of enterprise network 100 with attack vectors of an attacker at an early stage of lateral movement. Once an attacker has taken control of a first node in a corporate network, he uses different advance attack techniques for orientation and propagation and discovery of additional ways to reach other network nodes in the corporate network. Attacker movement from node to node is performed via an "attack vector", which is an object in memory or storage of a first computer that may be used to access a second computer.

Exemplary attack vectors include inter alia credentials of users with enhanced privileges, existing share names on different servers, and details of an FTP server, an email server, an SQL server or an SSH server and its credentials. Attack vectors are often available to an attacker because a user did not logoff his workstation or clear his cache. E.g., if a user contacted a help desk and gave the help desk remote access to his workstation and did not logoff his workstation, then the help desk access credentials may still be stored in the user's local cache and available to the attacker. Similarly, if the user accessed an FTP server, then the FTP account login parameters may be stored in the user's local cache or profile and available to the attacker.

Attack vectors enable inter alia a move from workstation A→server B based on a shared name and its credentials, connection to a different workstation using local admin credentials that reside on a current workstation, and connection to an FTP server using specific access credentials.

Reference is made to FIG. 3, which is a simplified diagram of enterprise network 100 with attack paths of an attacker at a later stage of lateral movement. Whereas IT "sees" the logical and physical network topology, an attacker that lands on the first network node "sees" attack vectors that depart from that node and move laterally to other nodes. The attacker can move to such nodes and then follow "attack paths" by successively discovering attack vectors from node to node.

When the attacker implements such a discovery process on all nodes in the network, he will be able to "see" all attack vectors of the corporate network and generate a "maximal attack map". Before the attacker discovers all attack vectors on network nodes and completes the discovery process, he generates a "current attack map" that is currently available to him.

An objective of the attacker is to discover an attack path that leads him to a target network node. The target may be a bank authorized server that is used by the corporation for ordering bank account transfers of money, it may be an FTP server that updates the image of all corporate points of sale, it may be a server or workstation that stores confidential information such as source code and secret formulas of the corporation, or it may be any other network node that is of value to the attacker and is his "attack goal node".

When the attacker lands on the first node, but does not know how to reach the attack goal node, he generates a current attack map that leads to the attack goal node.

SUMMARY

There is thus provided in accordance with an embodiment of the present invention a system for network surveillance to detect attackers, including a deception management server within a network of resources, including a deployment module managing and planting one or more decoy attack vectors in one or more of the resources in the network, wherein an attack vector is an object in memory or storage of a first resource that may be used to access a second resource, and one or more decoy servers accessible from resources in the network via one or more of the decoy attack vectors planted in the resources by the deployment module, each decoy server including a forensic alert module causing a real-time forensic application to be transmitted to a destination resource in the network when the decoy server is being accessed by a specific resource in the network via one or more of the decoy attack vectors planted in the specific resource by the deployment module, wherein the forensic application, when launched in the destination resource, identifies a process running within the specific resource that is accessing that decoy server, logs the activities performed by the thus-identified process in a forensic report, and transmits the forensic report to the deception management server.

There is additionally provided in accordance with an embodiment of the present invention a method of network surveillance to detect attackers, including planting one or more decoy attack vectors in one or more resources in a network of computers, wherein an attack vector is an object in memory or storage of a first resource that may be used to access a second resource, recognizing that a decoy server in the network is being accessed by a specific resource in the network via one or more of the decoy attack vectors planted in the specific resource by the planting, and causing a real-time forensic application to be transmitted to a destination resource, wherein the forensic application, when launched on the destination resource, is operative to identify a process running within the specific resource that is accessing the decoy server, log the activities performed by the thus-identified process in a forensic report, and transmit the forensic report to a deception management server.

There is further provided in accordance with an embodiment of the present invention a system for network surveillance to detect attackers, the system including a deception management server within a network of resources that is governed by an access governor that authorizes users to access the resources in the network based on user credentials, the deception management server including a deployment module, planting one or more decoy user credentials in one or more of the resources in the network, and a forensic alert module for causing a real-time forensic application to be transmitted to a destination resource in the network, in response to the access governor recognizing an attempt by a first resource to access a second resource in the network via one or more of the decoy credentials planted in the first resource by the deployment module, wherein the forensic application, when launched in the destination resource, identifies a process running within the first resource that is attempting to access the second resource, logs the activities performed by the thus-identified process in a forensic report, and transmits the forensic report to the deception management server.

There is yet further provided in accordance with an embodiment of the present invention a method of network surveillance to detect attackers, including planting one or more decoy user credentials in one or more resources in a network of resources that is governed by an access governor that authorizes users to access the resources in the network based on user credentials, recognizing an attempt by a first resource in the network to access a second resource in the network via one or more of the decoy user credentials planted in the first resource by the planting, and in response to the recognizing, causing a real-time forensic application to be transmitted to a destination resource, wherein the forensic application, when launched, is operative to identify a process running within the first resource that is accessing the decoy server, log the activities performed by the thus-identified process, and transmit the log to a deception management server.

There is moreover provided in accordance with an embodiment of the present invention a system for network surveillance to detect attackers, including a deception management server located within a network of resources, the network being governed by an access governor that authorizes users to access the resources in the network based on credentials that include a hash version of a cleartext password, the deception management server including a deployment module, planting one or more decoy credentials in one or more of the resources in the network, and a forensic alert module causing a real-time forensic application to be transmitted to a destination resource in the network, in response to recognizing that a first resource in the network attempts to access a second resource in the network using a decoy credential with its cleartext password, wherein the forensic application, when launched in the destination computer, identifies a process running within the first resource that is attempting to access the second resource, logs the activities performed by the thus-identified process in a forensic report, and transmits the forensic report to the deception management server.

There is additionally provided in accordance with an embodiment of the present invention a method of network surveillance to detect attackers, including planting a decoy credential in a first resource, wherein a credential enables a user to access a resource via a password, and wherein the decoy credential includes a hash of a cleartext password for accessing a second resource, recognizing that the first resource attempts to access the second resource using the cleartext password of the decoy credential, and causing, in response to the recognizing, a real-time forensic application to be transmitted to a destination computer, wherein the forensic application, when launched, is operative to identify a process running within the first resource that is attempting to access the second resource, log the activities performed by the thus-identified process, and transmit the log to a deception management server.

BRIEF DESCRIPTION OF THE DRAWINGS

The present invention will be more fully understood and appreciated from the following detailed description, taken in conjunction with the drawings in which.

For reference to the figures, the following index of elements and their numerals is provided. Similarly numbered elements represent elements of the same type, but they need not be identical elements.

| Table of elements in the figures | |
|---|---|
| Element | Description |
| 10 | Internet |
| 100 | enterprise network |
| 110 | network computers |
| 120 | network databases |
| 130 | network switches and routers |
| 140 | mobile devices |
| 150 | access governor (optional) |
| 160 | SIEM server |
| 170 | DNS server |
| 180 | firewall |
| 200 | enterprise network with network surveillance |
| 210 | deception management server |
| 211 | policy manager |
| 212 | deployment module |
| 213 | forensic application |
| 220 | database of credential types |
| 230 | policy database |
| 240 | decoy servers |
| 241 | tar-pit modules |
| 242 | forensic alert module |
| 250 | update server |

Elements numbered in the 1000's are operations of flow charts.

DETAILED DESCRIPTION

In accordance with embodiments of the present invention, systems and methods are provided for creating, deploying and managing augmentation to an attacker's current attack map. These systems and methods define decoy attack vectors that change the current attack map, and detect the attacker when he follows an attack vector that leads to a decoy network node.

Figure 1:
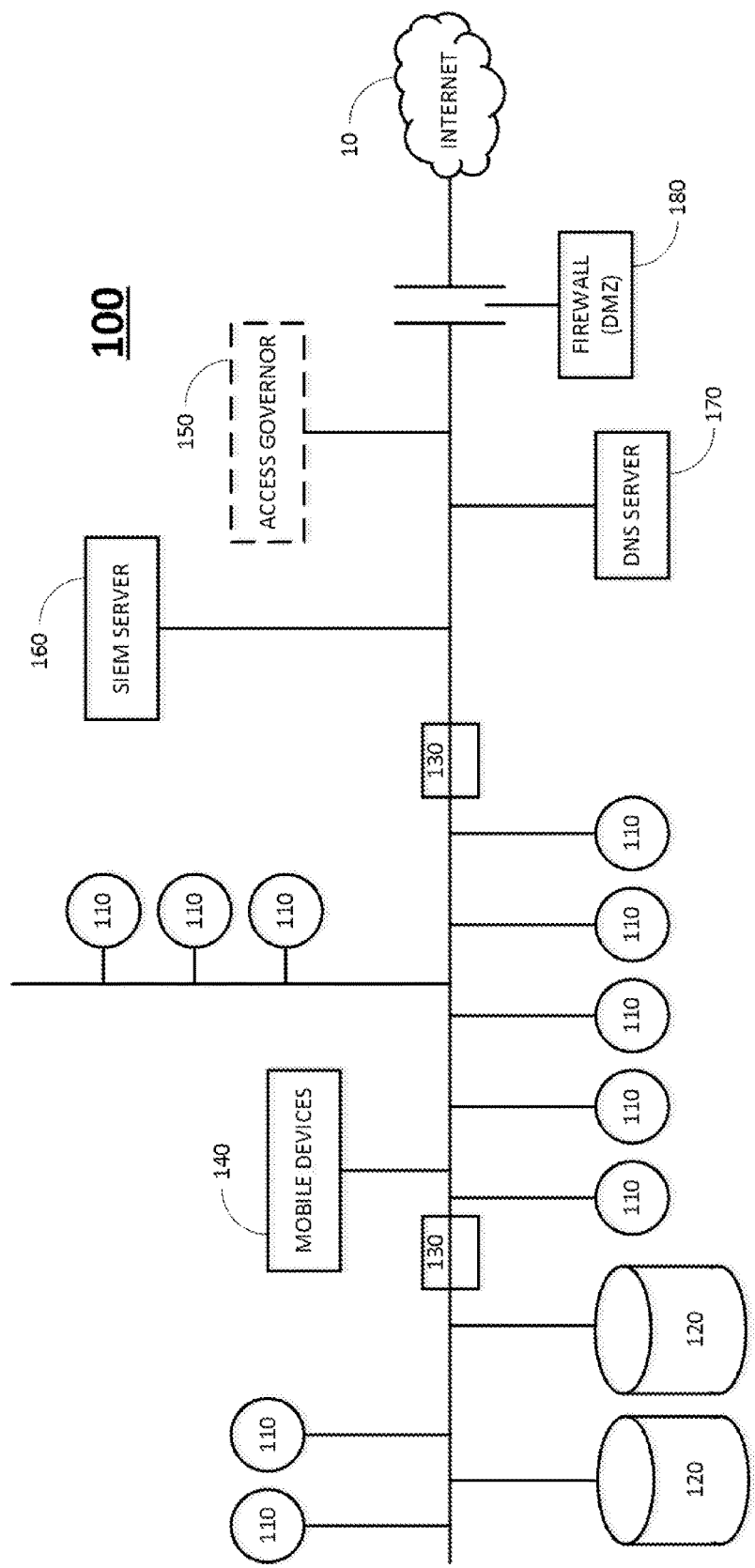
FIG. 1 is a simplified diagram of a prior art enterprise network connected to an external internet.
Figure 2:
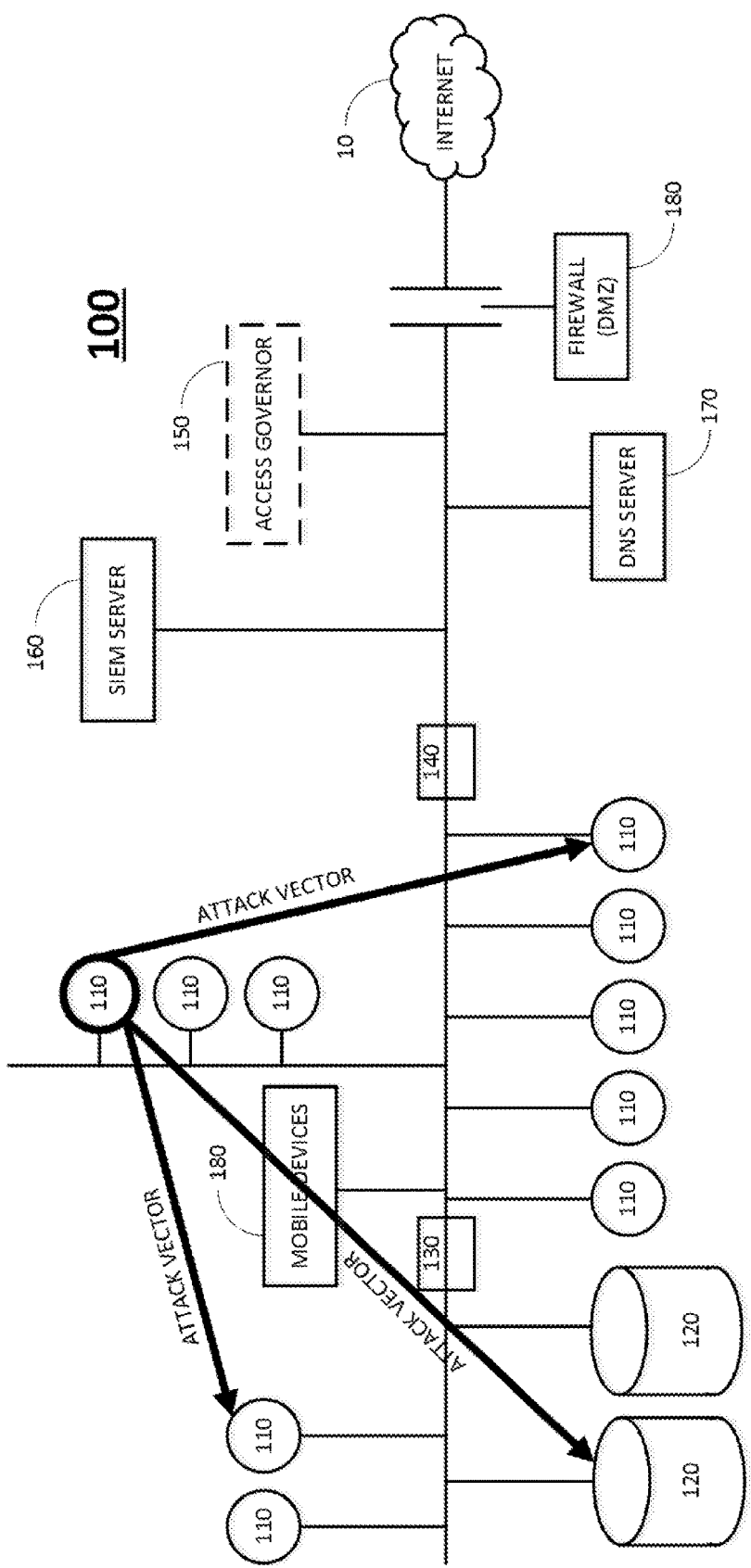
FIG. 2 is a simplified diagram of a prior art enterprise network with attack vectors of an attacker at an early stage of lateral movement.
Figure 3:
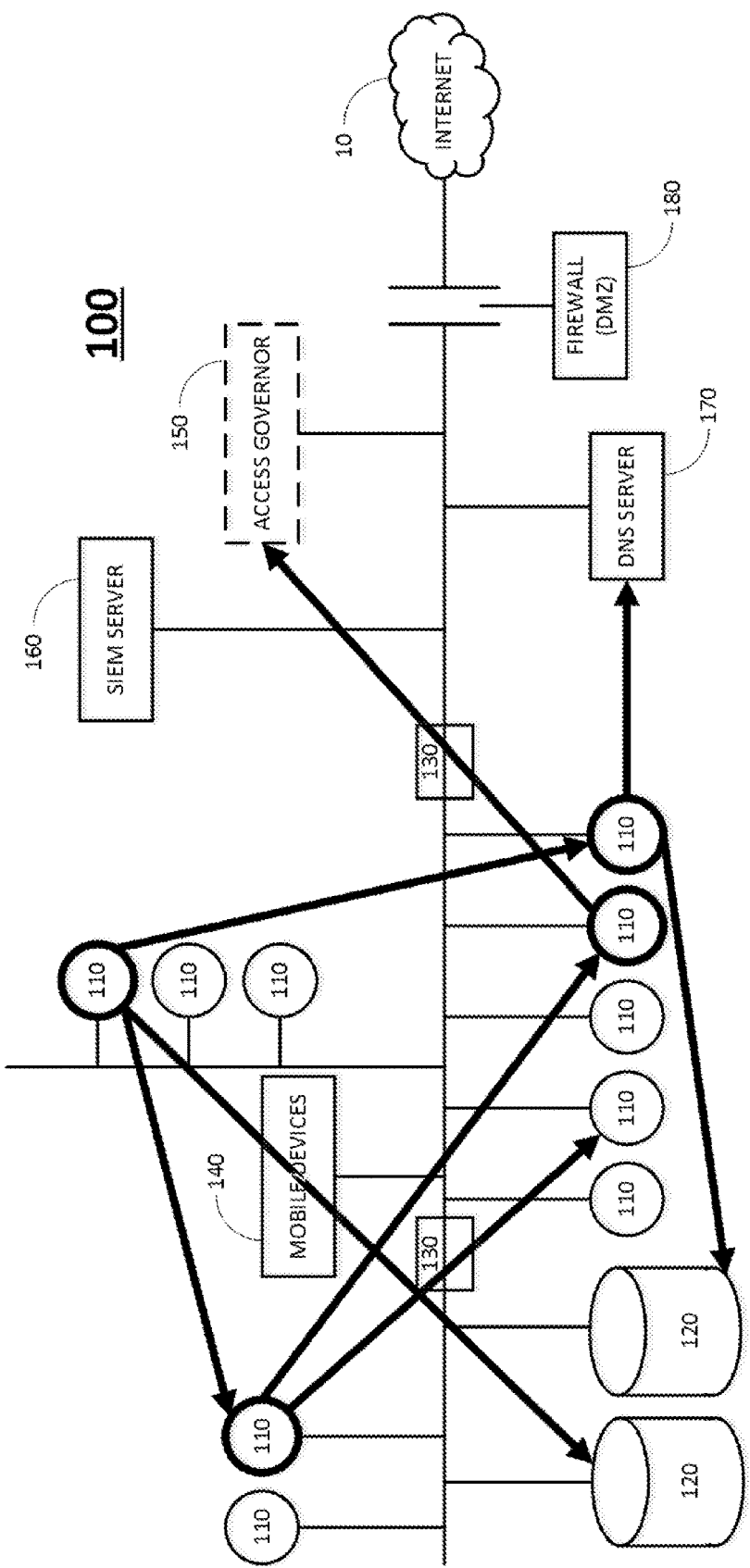
FIG. 3 is a simplified diagram of a prior art enterprise network with attack paths of an attacker at a later stage of lateral movement.
Figure 4:
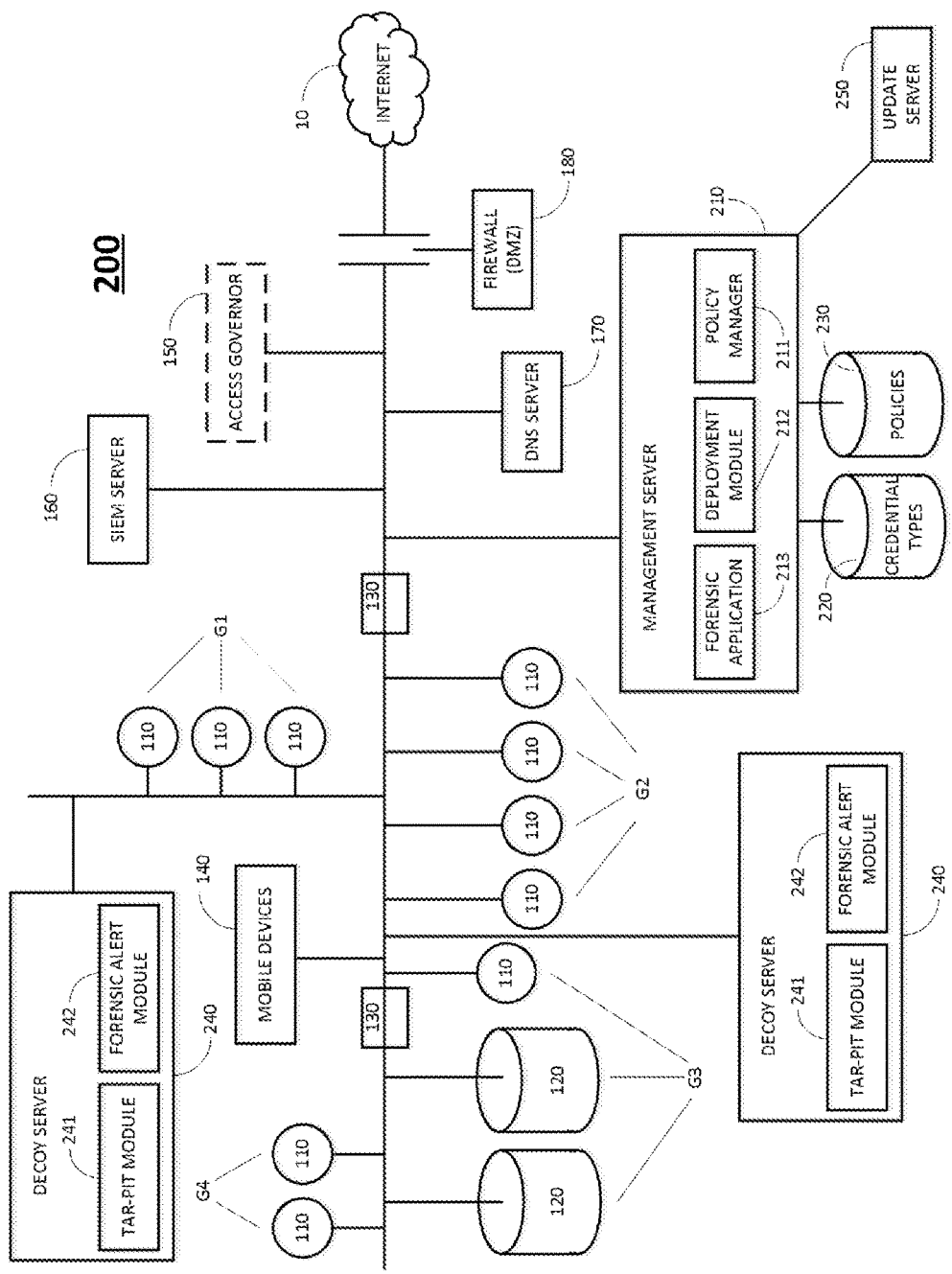
FIG. 4 is a simplified diagram of an enterprise network with network surveillance, in accordance with an embodiment of the present invention.

Reference is made to FIG. 4, which is a simplified diagram of an enterprise network 200 with network surveillance, in accordance with an embodiment of the present invention. Network 200 includes a deception management server 210, a database 220 of decoy attack vectors, a policy database 230 and decoy servers 240. In addition, network computers 110 and databases 120 are grouped into groups G1, G2, G3 and G4.

Database 220 stores attack vectors that fake movement and access to computers 110, databases 120 and other resources in network 200. Attack vectors include inter alia:
user credentials of the form <username> <password>
user credentials of the form <username> <hash of password>
user credentials of the form <username> <ticket>
FTP server credentials of the form <address> <username> <password>
SSH server credentials of the form <address> <username> <password>

The attack vectors stored in database 220 are categorized by families, such as inter alia
F1—user credentials
F2—connections
F3—FTP logins
F4—SSH logins
F5—share names
F6—databases
F7—network devices
F8—URLs
F9—Remote Desktop Protocol (RDP)
F10—recent command
F11—scanners Credentials for a computer B that reside on a computer A provide an attack vector for an attacker from computer A→computer B.

Database 220 communicates with an update server 250, which updates database 220 as attack vectors for accessing, manipulating and hopping to computers evolve over time.

Policy database 230 stores, for each group of computers, G1, G2, . . . , policies for planting decoy attack vectors in computers of that group. Each policy specifies decoy attack vectors that are planted in each group, in accordance with attack vectors stored in database 220. For user credentials, the decoy attack vectors planted on a computer lead to another resource in the network. For attack vectors to access an FTP or other server, the decoy attack vectors planted on a computer lead to a decoy server 240.

It will be appreciated by those skilled in the art the databases 220 and 230 may be combined into a single database, or distributed over multiple databases.

Deception management server 210 includes a policy manager 211, a deployment module 212, and a forensic application 213. Policy manager 211 defines a decoy and response policy. The response policy defines different decoy types, different decoy combinations, response procedures, notification services, and assignments of policies to specific network nodes, network users, groups of nodes or users or both. Once policies are defined, they are stored in policy database 230 with the defined assignments.

Deception management server 210 obtains the policies and their assignments from policy database 230, and delivers them to appropriate nodes and groups. It than launches deployment module 212 to plant decoys in end points, servers, applications, routers, switches, relays and other entities in the network. Deployment module 212 plants each decoy, based on its type, in memory (RAM), disk, or in any other data or information storage area, as appropriate. Deployment module 212 plants the decoy attack vectors in such a way that the chances of a valid user accessing the decoy attack vectors are low. Deployment module 212 may or may not stay resident.

Forensic application 213 is a real-time application that is transmitted to a destination computer in the network, when a decoy attack vector is accessed by a computer 110. When forensic application 213 is launched on the destination computer, it identifies a process running within that computer 110 that accessed that decoy attack vector, logs the activities performed by the thus-identified process in a forensic report, and transmits the forensic report to deception management server 210.

Once an attacker is detected, a "response procedure" is launched. The response procedure includes inter alia various notifications to various addresses, and actions on a decoy server such as launching an investigation process, and isolating, shutting down and re-imaging one or more network nodes. The response procedure collects information available on one or more nodes that may help in identifying the attacker's attack acts, attention and progress.

Each decoy server 240 includes a tar-pit module 241, which is a process that purposely delays incoming connections, thereby providing additional time for forensic application 213 to launch and log activities on a computer 110 that is accessing the decoy server. Each decoy server 240 also includes a forensic alert module 242, which alerts management system 210 that an attacker is accessing the decoy server via a computer 110 of the network, and causes deception management server 210 to send forensic application 213 to the computer that is accessing the decoy server. In an alternative embodiment of the present invention, decoy server 240 may store forensic application 213, in which case decoy server 240 may transmit forensic application 213 directly to the computer that is accessing the decoy server. In another alternative embodiment of the present invention, deception management server 210 or decoy server 240 may transmit forensic application 213 to a destination computer other than the computer that is accessing the decoy server.

Notification servers (not shown) are notified when an attacker uses a decoy. The notification servers may discover this by themselves, or by using information stored on access governor 150 and SIEM 160. The notification servers forward notifications, or results of processing multiple notifications, to create notification time lines or such other analytics.

Figure 5:
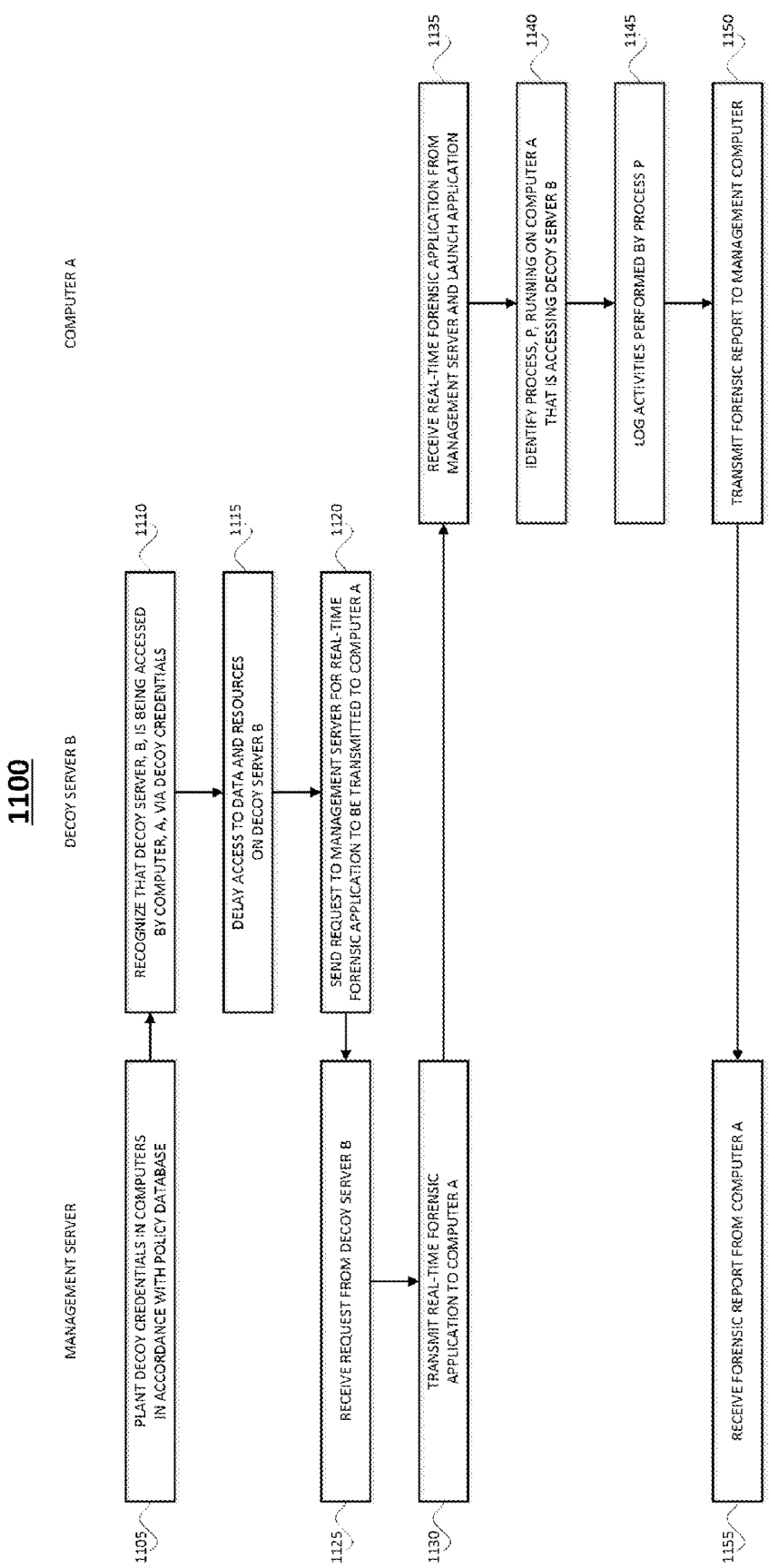
FIG. 5 is a simplified flowchart of a method for network surveillance and notification using decoy servers, in accordance with an embodiment of the present invention.

Reference is made to FIG. 5, which is a simplified flowchart of a method 1100 for network surveillance and notification using decoy servers, in accordance with an embodiment of the present invention. The flowchart of FIG. 5 is divided into three columns. The leftmost column includes operations performed by deception management server 210. The middle column includes operations performed by a decoy server B that is accessed from a computer A using decoy attack vectors. The rightmost column includes operations performed by computer A.

At operation 1105, deployment module 212 plants decoy attack vectors in computers 110 in accordance with the policies in database 230. At operation 1110 decoy server B recognizes that it is being accessed from a computer A via a decoy attack vector. At operation 1115, tar-pit module 241 of decoy server B delays access to data and resources on decoy server B. The delaying performed at operation 1115 provides additional time for decoy server B to send a request to deception management server 210 to transmit forensic application 213 to computer A, and for computer A to receive and run forensic application 213. At operation 1120, decoy server B sends a request to deception management server 210, to transmit real-time forensic application 213 to computer A.

At operation 1125, deception management server 210 receives the request send by decoy server B, and at operation 1130 deception management server 210 transmits forensic application 213 to computer A.

At operation 1135, computer A receives forensic application 213 from deception management server 210, and launches the application. At operation 1140, forensic application 213 identifies a process, P, running on computer A that is accessing decoy server B. At operation 1145, forensic application 213 logs activities performed by process P. At operation 1150, forensic application 213 transmits a forensic report to deception management server 210. Finally, at operation 1155, deception management server 210 receives the forensic report from computer A.

In accordance with an alternative embodiment of the present invention, decoy server B may store forensic application 213, in which case decoy server B may transmit forensic application 213 directly to computer A, and operations 1120, 1125 and 1130 can be eliminated.

In accordance with another alternative embodiment of the present invention, forensic application 213 is transmitted by deception management server 210 or by decoy server B to a destination computer other than computer A. When the destination computer launches forensic application 213, the application communicates with computer A to identify the process, P, running on computer A that is accessing decoy server B, log the activities performed by process P, and transmit the forensic report to deception management server 210

Figure 6:
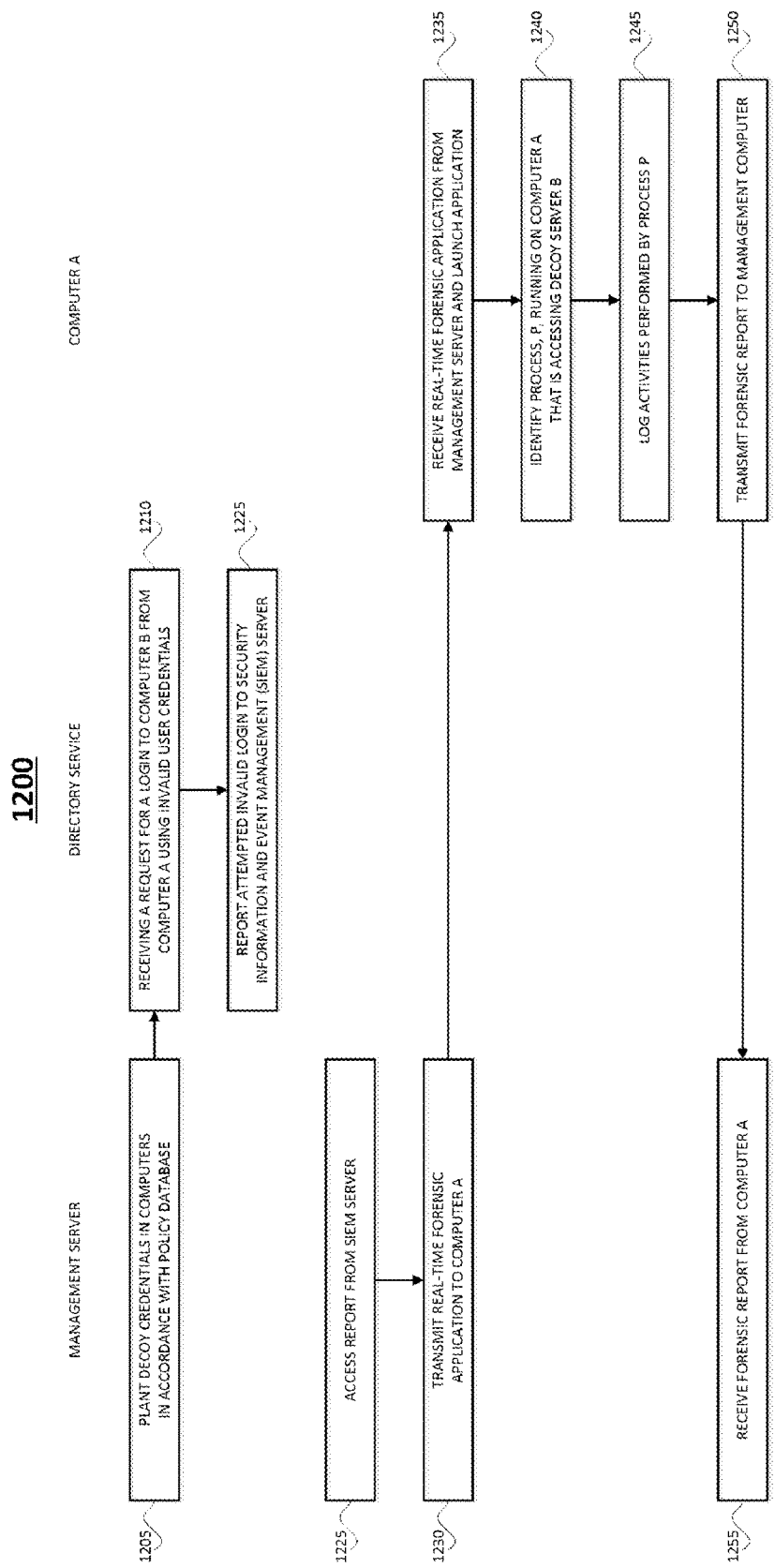
FIG. 6 is a simplified method for network surveillance and notification using decoy user credentials, in accordance with an embodiment of the present invention.

Reference is made to FIG. 6, which is a simplified method for network surveillance and notification using decoy user credentials, in accordance with an embodiment of the present invention. The flowchart of FIG. 6 is divided into three columns. The leftmost column includes operations performed by deception management server 210. The middle column includes operations performed by access governor 150. The rightmost column includes operations performed by a computer A that attempts to login to a computer B using decoy user credentials.

At operation 1205, deployment module 212 plants decoy credentials in computers 110 in accordance with the policies in database 230. At operation 1210 access governor 150 receives an authorization request from a computer B for a login to a computer A using invalid user credentials. At operation 1215 access governor 150 reports the attempted invalid login to SIEM server 160.

At operation 1225, deception management server 210 identifies an invalid login attempt event reported by SIEM server 160, and at operation 1230 deception management server 210 transmits real-time forensic application 213 to computer A.

At operation 1235, computer A receives forensic application 213 from deception management server 210, and launches the application. At operation 1240, forensic application 213 identifies a process, P, running on computer A that is accessing computer B. At operation 1245, forensic application 213 logs activities performed by process P. At operation 1250, forensic application 213 transmits a forensic report to deception management server 210. Finally, at operation 1255, deception management server 210 receives the forensic report from computer A.

In accordance with an alternative embodiment of the present invention, forensic application 213 is transmitted by deception management server 210 to a destination computer other than computer A. When the destination computer launches forensic application 213, the application communicates with computer A to identify the process, P, running on computer A that is accessing computer B, log the activities performed by process P, and transmit the forensic report to deception management server 210

As mentioned above, conventional honeypot systems generate many false alerts. Embodiments of the present invention enhance confidence levels in identifying an attacker, by luring him into multiple access attempts to different resources monitored by the system.

Figure 7:
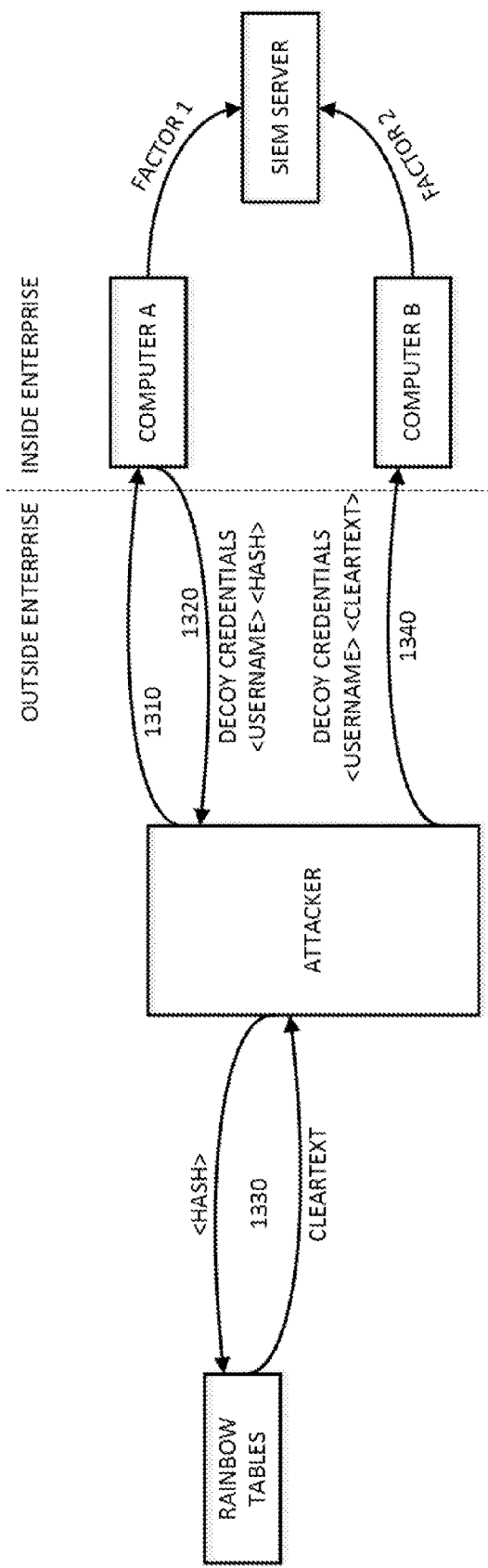
FIG. 7 is a simplified diagram of a method for network surveillance using two-factor deception, in accordance with an embodiment of the present invention.

Reference is made to FIG. 7, which is a simplified diagram of a method for network surveillance using two-factor deception, in accordance with an embodiment of the present invention. At operation 1310 an attacker accesses a computer A of network 200. At operation 1320 the attacker obtains decoy credentials for accessing a computer B of network 200, the decoy credentials being of the form <username> <hash>, where <hash> is a hash value of a cleartext password. The decoy credentials are preferably planted in computer A such that the chances of a valid user or automated monitor accessing the credentials are low.

At operation 1330 the attacker derives the cleartext password from <hash>. Operation 1330 may be performed by rainbow tables, which are pre-computed tables for reversing cryptographic hash functions. At operation 1340 the attacker attempts a login to computer B using the cleartext version of the decoy credentials <username> <cleartext password>. At this stage, the chances of such login being performed by a valid user or automated monitor are extremely low, since this login requires two suspicious factors; namely, (i) extracting the decoy credentials with the hash value of the cleartext password from computer A, and (ii) reversing the extracted hash value to obtain the cleartext password.

It will be appreciated by those skilled in the art that the two-factor method shown in FIG. 7 can be extended to more than two factors by successively planting a trail of decoy credentials that lead from one computer to the next.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A system for network surveillance to detect attackers, comprising:
    a deception management server within a network of resources, comprising:
        a deployment processor managing and planting one or more decoy attack vectors in one or more of the resources in the network, wherein an attack vector is an object in memory or storage of a first resource that may be used to access a second resource; and
        a notification processor; and
    one or more decoy servers accessible from resources in the network, each decoy server comprising a forensic alert processor that issues an alert when a specific resource in the network accesses that decoy server via one or more of the decoy attack vectors planted in that specific resource by said deployment processor, the alert causing said deception management server to transmit a real-time forensic application to the specific resource, wherein the forensic application, when launched in the specific resource, identifies a process running within the specific resource that is accessing that decoy server, logs the activities performed by the thus-identified process in a forensic report, and transmits the forensic report to said deception management server, wherein said notification processor transmits to a notification server a notification that a resource in the network accessed a decoy server, and information in the forensic report provided by the forensic application, in response to said deception management server receiving the forensic report.

2. The system of claim 1, further comprising an event monitor, recognizing an attempt by a first resource in the network to access a second resource in the network via the decoy attack vectors planted by said deployment processor in the first resource, and causing, in response to the recognizing, the real-time forensic application to be transmitted to the first resource.

3. The system of claim 2 wherein said notification processor transmits a notification to the notification server, in response to said deception management server receiving a forensic report from the forensic application running on the first resource.

4. The system of claim 1 wherein said deception management server further comprises a database of attack vectors, and wherein the one or more decoy attack vectors planted by said deployment processor are attack vectors in said database of attack vectors.

5. The system of claim 4, wherein the attack vectors in said database of attack vectors include at least one member of (i) username and password, (ii) username and authentication ticket, (iii) FTP server address, username and password, (iv) database server address, username and password, and (v) SSH server address, username and password.

6. The system of claim 4 further comprising an update server transmitting, from time to time, updated attack vectors to said database of attack vectors.

7. The system of claim 4, wherein the resources in the network are grouped into multiple groups of resources, wherein said deception management server further comprises a database of policies that specify, for each group of resources on the network, one or more decoy attack vectors to plant in that group of resources, from among the attack vectors in said database of attack vectors, and wherein said deployment processor plants the one or more decoy attack vectors in the groups of resources in accordance with the database of policies.

8. The system of claim 1 wherein each decoy server further comprises a tar-pit processor, delaying access to data on the decoy server while a resource accesses that decoy server.

9. A method of network surveillance to detect attackers, comprising:
    planting one or more decoy attack vectors in one or more resources in a network of computers, wherein an attack vector is an object in memory or storage of a first resource that may be used to access a second resource;
    recognizing that a decoy server in the network is being accessed by a specific resource in the network via one or more of the decoy attack vectors planted in the specific resource by said planting;
    causing a real-time forensic application to be transmitted to the specific resource, wherein the forensic application, when launched on the specific resource, is operative to:
        identify a process running within the specific resource that is accessing the decoy server;
        log the activities performed by the thus-identified process in a forensic report; and
        transmit the forensic report to a deception management server; and
    transmitting to a notification server a notification that a resource in the network accessed a decoy server, and information in the forensic report provided by the forensic application, in response to the deception management server receiving the forensic report.

10. The method of claim 9 further comprising delaying access to data on the decoy server while the specific resource accesses the decoy server.

11. The method of claim 9 further comprising:
    recognizing an attempt by a first resource in the network to access a second resource in the network via one or more of the decoy attack vectors planted in the first resource by said planting; and
    causing the real-time forensic application to be transmitted to the first resource, in response to said recognizing.

12. The method of claim 9, wherein the decoy attack vectors include at least one member of (i) username and password, (ii) username and authentication ticket, (iii) FTP server address, username and password, (iv) database server address, username and password, and (v) SSH server address, username and password.

13. A system for network surveillance to detect attackers, the system comprising:
    a deception management server within a network of resources that is governed by an access governor that authorizes users to access the resources in the network based on user credentials, the deception management server comprising:

a deployment processor, planting one or more decoy user credentials in one or more of the resources in the network; and a notification processor; and a forensic alert processor that issues an alert when said access governor recognizes an attempt by a first resource in the network to access a second resource in the network via one or more of the decoy credentials planted in the first resource by said deployment processor, the alert causing said deception management server to transmit a real-time forensic application to the first resource, wherein the forensic application, when launched in the first resource, identifies a process running within the first resource that is attempting to access the second resource, logs the activities performed by the thus-identified process in a forensic report, and transmits the forensic report to said deception management server, wherein said notification processor transmits to a notification server a notification that the first resource attempted to access the second resource via decoy credentials, and information in the forensic report provided by the forensic application, in response to said deception management server receiving the forensic report.

14. A method of network surveillance to detect attackers, comprising:

planting one or more decoy user credentials in one or more resources in a network of resources that is governed by an access governor that authorizes users to access the resources in the network based on user credentials;

recognizing an attempt by a first resource in the network to access a second resource in the network via one or more of the decoy user credentials planted in the first resource by said planting;

in response to said recognizing, causing a real-time forensic application to be transmitted to the first resource, wherein the forensic application, when launched, is operative to:

identify a process running within the first resource that is accessing the decoy server;

log the activities performed by the thus-identified process; and transmit the log to a deception management server; and transmitting to a notification server a notification that a resource in the network accessed a decoy server, and information in the forensic report provided by the forensic application, in response to the deception management server receiving the forensic report.

* * * * *